Figure 1:
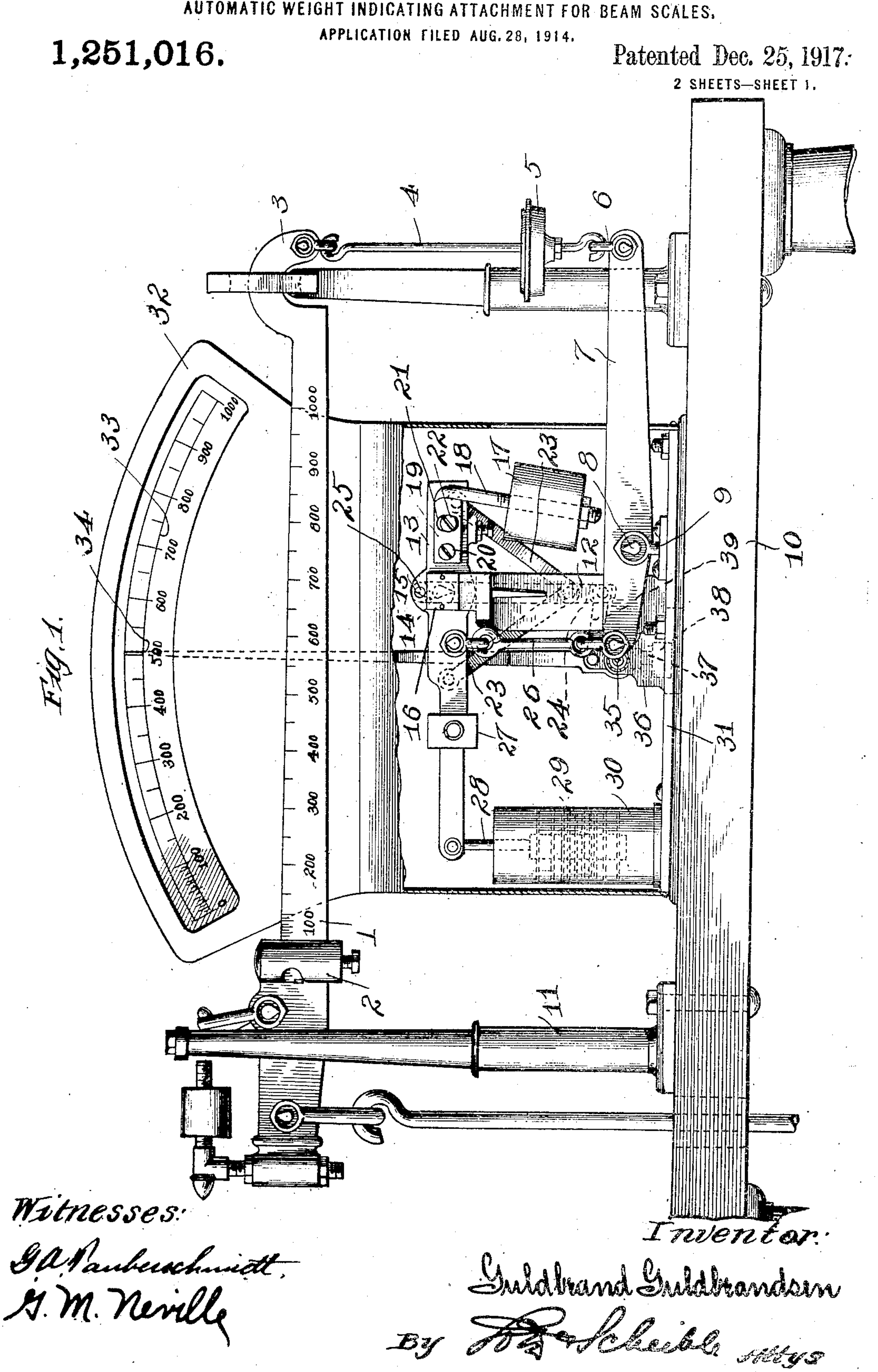
Figure 3:
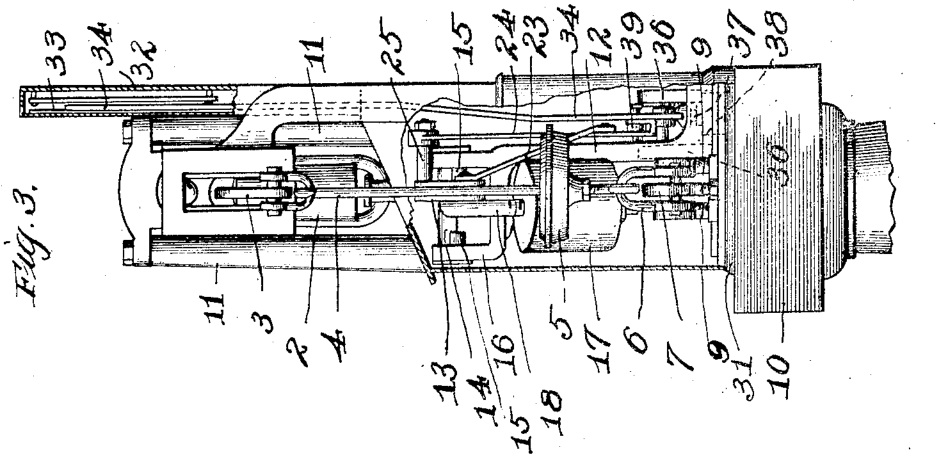
Figure 2:
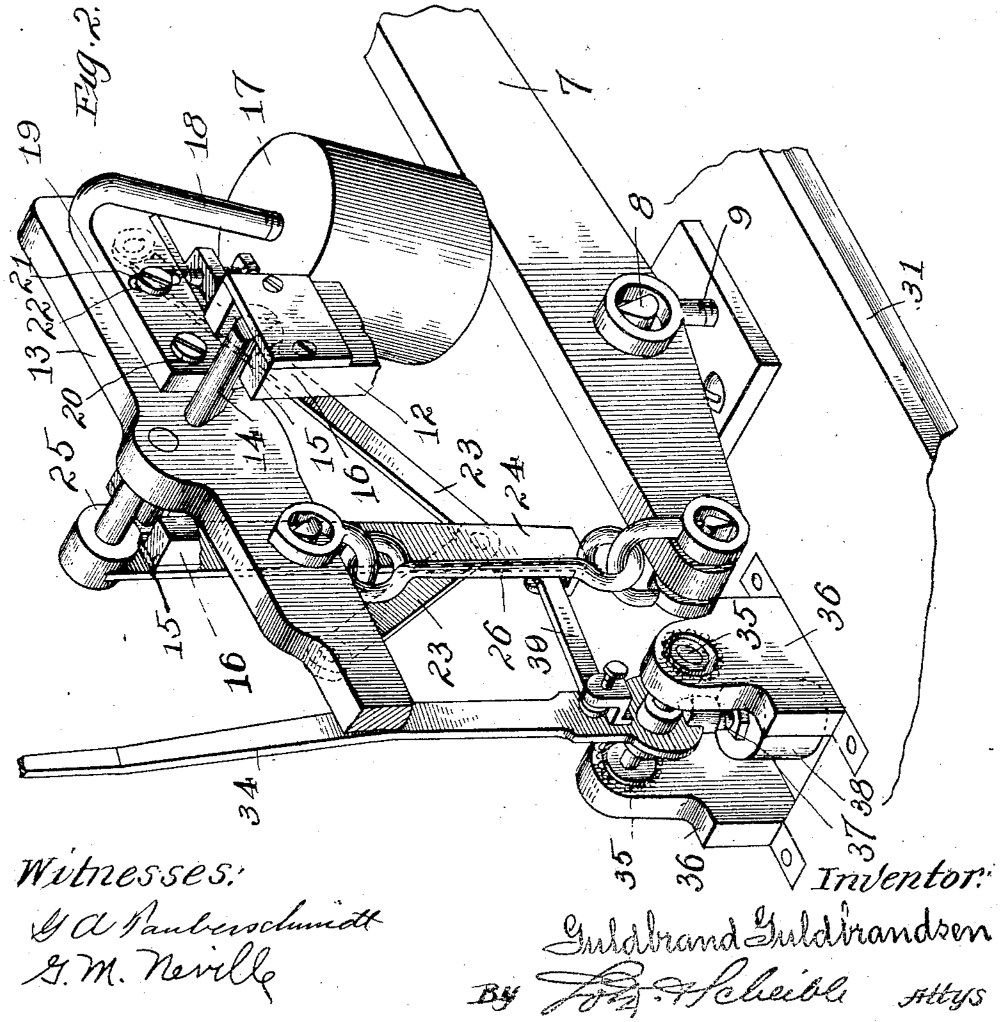

G. GULDBRANDSEN.

AUTOMATIC WEIGHT INDICATING ATTACHMENT FOR BEAM SCALES.

APPLICATION FILED AUG. 28, 1914.

1,251,016. Patented Dec. 25, 1917.

2 SHEETS—SHEET 1.

Witnesses:

G. A. Paubenschmidt.

G. M. Neville

Inventor:

Guldbrand Guldbrandsen

By [signature] Scheible Attys

G. GULDBRANDSEN.

AUTOMATIC WEIGHT INDICATING ATTACHMENT FOR BEAM SCALES.

APPLICATION FILED AUG. 28, 1914.

1,251,016. Patented Dec. 25, 1917.

2 SHEETS—SHEET 2.

Witnesses:

G A Raubenschmidt

G. M. Neville

Inventor:

Guldbrand Guldbrandsen

By Louis F. Scheible Attys

UNITED STATES PATENT OFFICE.

GULDBRAND GULDBRANDSEN, OF CHICAGO, ILLINOIS.

AUTOMATIC WEIGHT-INDICATING ATTACHMENT FOR BEAM-SCALES.

1,251,016. Specification of Letters Patent. Patented Dec. 25, 1917.

Application filed August 28, 1914. Serial No. 858,997.

*To all whom it may concern:*

Be it known that I, Guldbrand Guldbrandsen, a citizen of Denmark, residing at Chicago, in the county of Cook and State of Illinois, have invented certain new and useful Improvements in Automatic Weight-Indicating Attachments for Beam-Scales; and I do hereby declare the following to be a full, clear, and exact description of the invention, such as will enable others skilled in the art to which it appertains to make and use the same.

This invention has for its object to provide an attachment for beam-scales adapted to be actuated by the beam of the scale to automatically indicate on a dial, or similar registering device, the weight of the load on the scale-platform without requiring the usual adjustment of the position of any weight on the scale-beam itself.

The invention consists in the features of construction and combinations of parts hereinafter fully described and particularly claimed.

In the accompanying drawings illustrating my invention:

Figure —1— is a view in side elevation of the upper portion of a beam-scale equipped with an attachment embodying my invention.

Fig. —2— is a detail fragmentary perspective view showing the indicating-hand-operating portion of the attachment thereto.

Fig. —3— is an end elevation of the matter illustrated in Fig. —1—.

In the use of beam scales it is necessary, for ascertaining the weight of each parcel, package or load placed on the scale platform, to adjust the sliding weight carried by the scale-beam, and where said weight exceeds the maximum weight indicative by adjustment of said movable weight on the scale beam to the last graduation thereon, it is further necessary to place other balance-weights on the depending rod carried by the outer end of the beam. This renders the operation of weighing numerous packages or loads relatively slow and, where scales are used to a great extent, as in railroad freight houses and similar places, economy in the time required to ascertain the weight of these packages is very desirable.

The object of my invention is to provide an attachment operable from the scale-beam with automatically indicating means to come quickly to a stop without in any way affecting the delicacy or accuracy of the weight-ascertaining mechanism.

Other objects of the invention relate more particularly to details of construction hereinafter fully described and particularly claimed.

In the accompanying drawings I have shown the upper portion of a beam-scale including the scale-beam 1 having the sliding balance-weight 2 mounted thereon, the said scale-beam being hung in the usual manner. The outer end portion 3 of said beam carries the usual depending rod 4 upon which a counter-weight 5 is mounted, the latter being adapted to support additional balance weights in the usual and well-known manner. The lower end of said rod 4 is connected by means of a link 6 with a beam or lever 7 hung between its ends upon knife pivots 8 carried upon a standard 9 mounted upon the cross-piece 10 at the upper end portion of the beam scale and which supports the base plate of my said attachment upon which is mounted the standard 11 carrying the scale beam 1.

The said standard 9 carrying said knife pivots 8 is disposed contiguous to a standard 12 at the upper end portion of which a scale beam 13 is pivotally supported between its ends upon the knife-pivot members 14 carried by said beam 13 and engaging in the concave recesses 15 in the upper end of said standard 12 and in a bracket 16 integral with the latter, the scale-beam 13 being disposed between the upper end portion of said standard and the opposed parallel arm of said bracket 16. At one end of said scale-beam I provide a depending counter-weight 17 which has threaded engagement with a rod 18 which is integral with a plate or flange 19 pivotally secured to the beam 13 by means of a set screw 20 and which is provided with a slot 21 between the point of its engagement with said set screw 20 and the rod 18 and is concentric with the axis of said set-screw. A set-screw 22 passes through said slot 21 into the beam 13 and enables the position of the plate on said beam 13 to be adjusted within the limits fixed by the length of said slot 21 whereby the weight 17 will be swung to lie at varying distances from the vertical plane of the axis of oscillation of said beam 13. The said weight 17 will be hereinafter referred to as the "pendulum-weight," it being obvious that as the beam 13 oscillates said weight will shift its position relatively to the vertical plane of the axis of the knife pivot member 14 in the manner of a pendulum thereby resisting actuation of said beam 13 by the scale-beam 1 as hereinafter more fully set forth.

Secured at the ends of its arms to the beam 13 on respectively opposite sides of the pivotal support of the latter is a V-shaped brace 23, the elbow portion of which is secured to a depending rocker arm 24 rigid with the beam 13 and mounted upon a pin 25 propecting laterally from the latter in the vertical plane of the pivotal support therefor, the said brace 23 being adapted to insure rigidity of said arm 24 relatively to the beam 13. The latter is connected with the other end of the beam 7 by means of a link 26 in a well-known manner; said connection being effected with the end-portion of the beam 13 on the opposite side of its pivotal support from that carrying said weight 17. Thus, any movement of the beam 1 will be communicated through the beam 7 to the beam 13 and the said arm 24. The beam 13 is further provided on its last-named end with an adjustable sliding balance weight 27 which together with the adjustability of the weight 17 enables a perfect adjustment and balancing of the attachment as will be obvious. At the extreme last-named end portion of the beam 13 the latter carries a depending rod or plunger 28 which carries a plurality of what may be termed piston members 29 which fit relatively loosely in a cylindrical dash pot 30 carried upon the base plate of the attachment, and which is filled with a liquid such as a lubricating oil, and is adapted to prevent free oscillation or vibration of the beam 13 for reasons hereinafter more fully pointed out. By thus equipping the plunger with a plurality of pistons spaced from one another along the axis of the plunger, I am able to obtain an unusually effective dampening action, as the oil must successively pass around each of the consecutive pistons when the plunger descends or ascends in the dashpot.

At the rear edge of the base 31 of my said attachment is an upwardly projecting flange 32 constituting the rear wall of a housing for the aforesaid mechanism, said flange having a segmental upper edge concentric with which is a segmental indicating dial 33 concentric with and upon the graduations of which the free end portion of an indicating hand is adapted to indicate the weights of loads on the scale platform. The said hand is pivotally mounted at its other end in ball-bearings 35 in parallel vertical standards 36 mounted upon the base 31, and at its lower end said hand is provided with a threaded projection 37 carrying a counterweight 38 which is adapted to maintain said hand 34 normally in register with the middle point of the segmental dial 33. The said hand is connected, immediately above its pivotal connection with the standards 36 and by means of a link 39, with the said arm 24 at the lower end of the latter, said link 39 being pivotally connected with the hand and said arm by suitable means adapted to minimize friction. As the arm 24 oscillates it will obviously oscillate the hand 34 so that the latter will move over the dial and indicate weight thereon.

Assuming that the capacity of the scale is to weigh a load not exceeding one thousand pounds, and that the graduations of the dial 33 extend from zero at the left to one thousand at the right, then, if the weight 2 is placed on the scale-beam 1 to register with the zero graduation thereof the said hand 14 will normally register with the zero graduation of the dial 33. As a weight is imposed upon the scale-platform the beam 1 will swing upwardly at its outer end and this movement will be imparted to the beam 7 and through the latter to the beam 13 and indicating hand 34, thus causing the latter to move toward the right. The movement of the beam 13 is resisted by the pendulum-weight 7, the center of gravity of which moves gradually farther from the pivotal axis of said beam as the outer end of the scale beam 1 rises, in a well-known manner. The movement of the scale-beam 13 causes the displacement or movement of a part of the oil in the dash pot 30 from below to above the piston members, and this will obviously cause the hand 34 as well as the beam 13 and parts connected therewith to rapidly come to rest so that the hand 34 will indicate the correct weight of a load on the scale platform. The said dash-pot 30 does not, because of the freedom of movement of the piston members therein, impose friction upon the mechanism and does not in any way affect the delicacy and accuracy of the operation of such mechanism.

As the weight 2 is moved toward the outer end of the beam 1 to register, for example, with the last graduation of said beam 1, no weight unless in excess of one thousand pounds placed upon the scale platform will cause the beam 1 to swing upwardly, and consequently the position of the weight 2 on the beam 1 does not in any way affect the operation of the attachment. If a weight in excess of one thousand pounds is placed upon the scale platform when the weight 2 is positioned to register with the "1000" graduation of the beam 1 the latter will be swung upwardly, thereby causing the hand 34 to indicate on the dial 33 the weight of the load in excess of one thousand pounds. And similarly if additional counterweights are disposed upon the counterbalance weight 5, then said attachment will indicate only the weight of the load in excess of the minimum at which such load will actuate said beam 1.

It will be observed that my said attachment is very simple in construction and affords no delicate parts which will easily get out of order, or which will require expert service for adjustment or repair. Moreover, the attachment of my invention can readily be applied to present scales by removing the previously used counterpoise, and attaching the counterpoise connected to my appliance. So also, in case of any accident to my attachment, or derangement of the same, it can quickly be detached by unhooking the counterpoise rod 4 and replacing it with the ordinary type of counterpoise, after which the scale can be used in the usual manner.

I claim as my invention:

1. An attachment for a beam scale comprising an auxiliary beam linked at one end to the free end of the main beam, a pendulum lever beam linked to the opposite end of the auxiliary beam and arranged to counterbalance said auxiliary beam, a pivotally mounted indicator hand also linked to said pendulum lever for operation thereby and a dial over which said indicator hand is adapted to sweep to indicate the load to which said main scale beam is subjected.

2. An attachment for an ordinary platform weighing scale for automatically indicating scale loads when the ordinary poise is maintained in a fixed position on the scale beam and comprising a secondary beam having a long end and a short end, the long end thereof linked to the free end of the main beam of the scale, a counterbalance beam linked at one end to the short end of the secondary beam, a pendulum counterbalance weight carried by the opposite end of said counterbalance beam, a pivotally mounted indicator hand operatively connected to said counterbalance beam for positive movement thereby to indicate the position thereof, said position being determined by a balance automatically established between said pendulum weight and the load on the scale, and a dial over which said indicator hand sweeps to show the weight of said load.

3. An attachment for an ordinary beam scale for automatically counterbalancing and indicating the load on the scale and comprising an indicator hand, movable over a dial to indicate the load, a pendulum weighted beam linked to said hand for positively positioning same, a secondary scale beam connected at one end to the non-weighted end of said pendulum beam and at the other end linked to the free end of the main beam of the scale for positive movement thereby, whereby the weight on the pendulum lever automatically counterbalances the load on the scale and the hand indicates said load.

4. An attachment for an ordinary beam scale for automatically counterbalancing and indicating the load on the scale and comprising an indicator hand, movable over a dial to indicate the load, a pendulum weighted beam linked to said hand for positively positioning same, a secondary scale beam connected at one end to the non-weighted end of said pendulum beam and at the other end linked to the free end of the main beam of the scale for positive movement thereby, whereby the weight on the pendulum lever automatically counterbalances the load on the scale and the hand indicates said load, and means for governing the movements of said pendulum beam to prevent sudden oscillations thereof.

5. An attachment for an ordinary beam scale for automatically counterbalancing and indicating the load on the scale and comprising an indicator hand, movable over a dial to indicate the load, a pendulum weighted beam linked to said hand for positively positioning same, a secondary scale beam connected at one end to the non-weighted end of said pendulum beam and at the other end linked to the free end of the main beam of the scale for positive movement thereby, whereby the weight on the pendulum lever automatically counterbalances the load on the scale and the hand indicates said load, a piston, rigid connection between the piston and said pendulum lever for causing positive movements of the piston corresponding with those of the lever, and a cylinder in which said piston is movable to constitute a dash pot to prevent sudden oscillations of said pendulum lever.

6. An attachment for ordinary scales having a beam for converting the same into an automatic weight indicator of a capacity equal to the maximum weight indications of the scale-beam, said attachment comprising an indicating dial mounted on a rigid portion of the scale and bearing a graduated scale indicating weight to the maximum weight-indication capacity of the scale-beam, an indicator hand adapted to register on said graduated scale, a weighted pendulum lever linked to said hand for actuating same, and easily disconnectible link connections between the scale beam and the pendulum lever for actuating the latter in accordance with the movements of the scale-beam under the influence of load on the scale platform whereby the scale is readily convertible from an ordinary beam scale to an automatic scale and back again.

In testimony whereof I have signed my name in presence of two subscribing witnesses.

GULDBRAND GULDBRANDSEN.

Witnesses:
M. M. BOYLE,
W. A. PETERS.

Copies of this patent may be obtained for five cents each, by addressing the "Commissioner of Patents, Washington, D. C."